US005617172A

United States Patent [19]
Ohta et al.

[11] Patent Number: 5,617,172
[45] Date of Patent: Apr. 1, 1997

[54] CAMERA BATTERY COVER STRUCTURE

[75] Inventors: Hidefumi Ohta, Kawasaki; Kiyosada Machida, Urawa, both of Japan

[73] Assignee: Nikon Corporation, Tokyo, Japan

[21] Appl. No.: 581,921

[22] Filed: Jan. 2, 1996

[30]    Foreign Application Priority Data

Feb. 8, 1995   [JP]   Japan .................... 7-020778

[51] Int. Cl.$^6$ ................................. G03B 17/02
[52] U.S. Cl. ................................. 396/539
[58] Field of Search ...................... 354/288, 202, 354/484; 429/100

[56]            References Cited

U.S. PATENT DOCUMENTS

| | | | |
|---|---|---|---|
| 4,214,830 | 7/1980 | Schroder | 354/202 |
| 4,937,606 | 6/1990 | Soumi et al. | 354/288 |
| 4,991,225 | 2/1991 | Holcomb et al. | 429/100 |
| 5,155,512 | 10/1992 | Leonard | 354/82 |
| 5,255,035 | 10/1993 | Kichima | 354/195.1 |
| 5,471,667 | 11/1995 | Yamada | 429/100 |
| 5,508,124 | 4/1996 | Gordecki et al. | 429/100 |

*Primary Examiner*—Safet Metjahic
*Assistant Examiner*—Eddie C. Lee

[57]            ABSTRACT

A camera battery cover structure, covering a battery chamber adjacent to a camera's rear cover hinge, having an attachment and removal guide provided on an extended line from the rear cover hinge, for attaching one side edge of a battery cover to the camera body so that it can be freely attached and removed.

15 Claims, 2 Drawing Sheets

CAMERA BATTERY COVER STRUCTURE

BACKGROUND OF THE INVENTION

1. Field of the Invention

The present invention relates to a camera battery cover structure for closing the battery chamber housing a battery inside a camera body. More particularly, the present invention relates to a freely attachable and removable camera battery cover having an attachment and removal guide provided on the extended line from a camera's rear cover hinge such that compactness is achieved by avoiding an increase in the width of the camera body.

2. Description of the Related Art

In compact cameras, a known type of battery chamber, that houses the battery inside the camera body, is one which is configured and positioned such that it forms an opening at the rear surface of the camera body and is closed by a battery cover after the batteries are loaded. With the prevalence of various types of electrical mechanisms in recent cameras, most notably, autofocus mechanisms and motor drive mechanisms, the capacity of the batteries loaded into camera bodies of this type is becoming greater. Thus, it is common to position this type of battery chamber independently, at the rear surface of the camera body, in a location which is separate from the rear cover of the camera. Moreover, it is desirable that the position where the battery chamber is located at the rear surface of this type of camera body be in an area to one side of the hinge of the rear cover of the camera, taking into account the battery insertion and removal operability and free space on the surface of the camera body where it is not necessary to attach other members. Therefore, the battery chamber has conventionally been positioned in an area adjacent to the hinge of the rear cover, and a type of battery cover which closes the opening of this battery chamber was provided so that it could be attached and removed freely, or opened and closed freely, by an appropriate catch or hinge mechanism attached to the edge of the opening of the battery chamber.

However, in the conventional battery cover structure, the following problems are involved in positioning the battery cover in the vicinity of the battery cover hinge at the rear surface of the camera body.

In compact cameras, making the camera more compact is an important issue, and attaching a rear cover as well as a battery cover on a common hinge so that they can both open and close freely on the rear surface of such a camera body makes it difficult to limit the width dimensions of the camera. Having the same hinge shaft for both the rear cover and the battery cover is conceivable, but the structure would be complicated, resulting in problems in the ease of assembly. Moreover, with this type of structure, there is the danger of the hinge being damaged when force is inadvertently exerted in the respective opening directions when the rear cover and the battery cover are both already opened. Also, when there is a common hinge, it is necessary to incorporate leeway into the camera body for opening both covers, potentially resulting in the degradation of the external appearance.

For the reasons above, it is conceivable to configure and position a battery chamber at a position adjacent to the hinge of the rear cover so that it can be freely attached and removed. However, in employing a type of battery cover structure which can be freely attached and removed, it is necessary to attach fitting protrusions and catches. A fitting protrusion, such as a guide, is necessary for guiding the battery cover in the attachment and removal direction. For attachment and removal in the direction of the rear cover hinge, guides are necessary on both side edges of the battery cover, one guide being on the battery cover edge adjacent to, and apart from, the rear cover hinge. As a result, the width of the camera body with this type of battery cover structure must be increased by an amount equal to the size of the guides, making it impossible to respond to the need for further compactness.

SUMMARY OF THE INVENTION

Accordingly, it is an object of the present invention to provide a battery cover suitable for a camera that is attachable and removable without increasing the width of the camera body and contributing to the compactness of the camera body.

It is a further object of the present invention to provide a battery cover suitable for a camera that is attached in conjunction with a rear cover hinge at a rear surface of the camera body through a simple construction.

It is another object of the present invention to provide a battery cover structure suitable for a camera and that avoids damage to the rear cover hinge and to the outer appearance of the rear cover.

Objects of the present invention are achieved by providing a battery cover structure suitable for a camera and having an attachment and removal guide located on the extended line of the rear cover hinge shaft for attaching one side edge of the battery cover to the camera body so that it can be freely attached and removed.

Objects of the present invention are also achieved by providing a battery cover structure suitable for a camera and having an attachment and removal guide forming a unit with the rear cover hinge shaft for attaching one side edge of the battery cover to the camera body so that it can be freely attached and removed.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
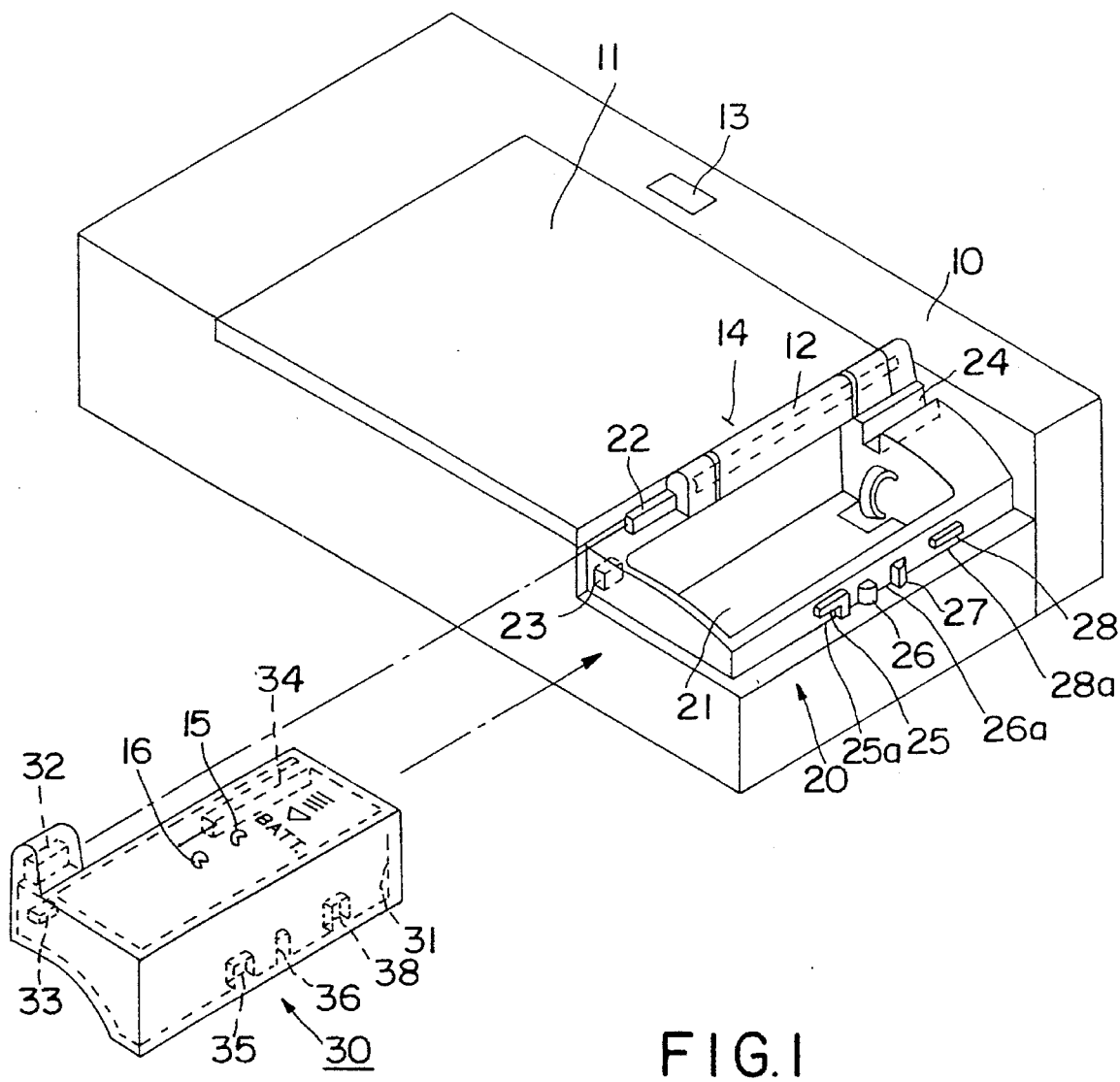
FIG. 1 is a view of the rear portion of a camera showing a preferred embodiment of a camera battery cover structure according to the present invention.

Reference will now be made in detail to the present preferred embodiments of the present invention, examples of which are illustrated in the accompanying drawings, wherein like reference numerals refer to like elements throughout.

Figure 2:
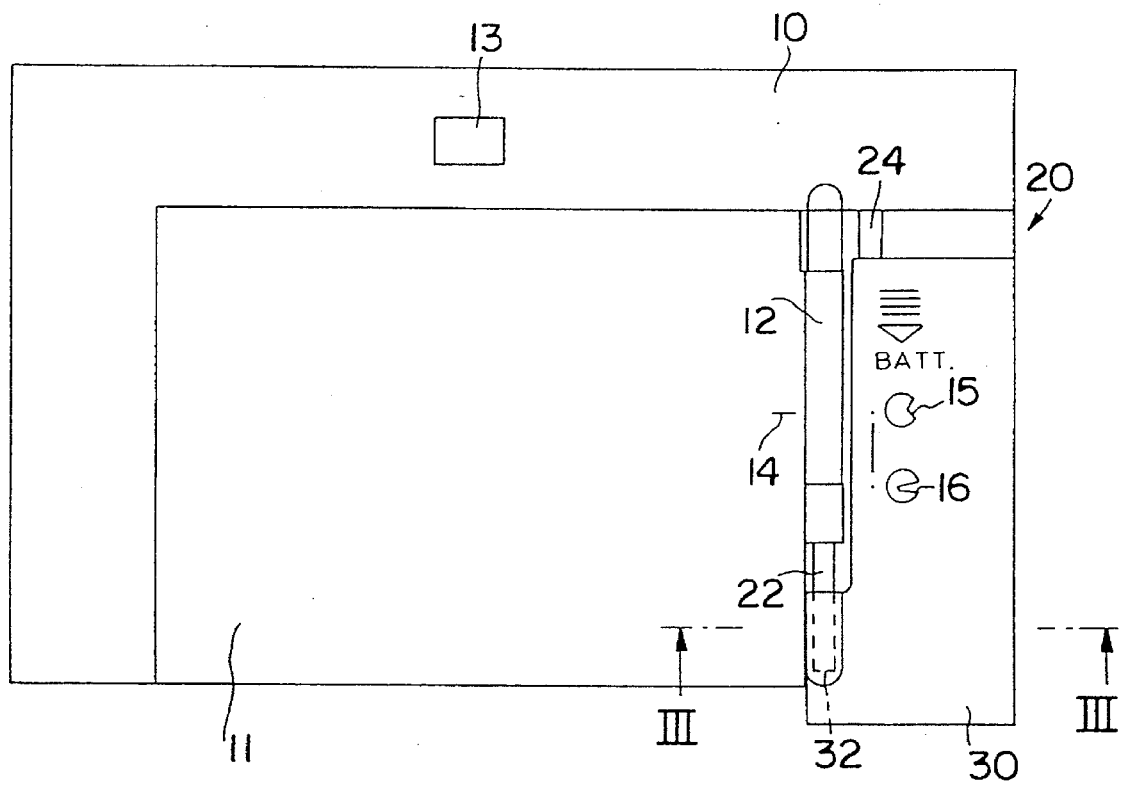
FIG. 2 is a diagram of the rear surface of a camera showing a preferred embodiment of a camera battery cover structure according to the present invention.
Figure 3:
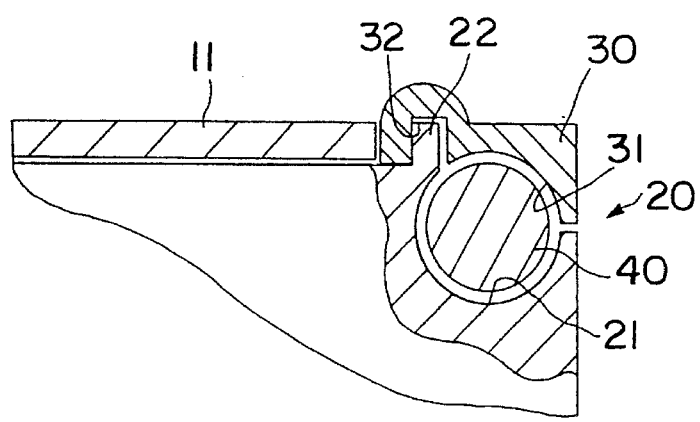
FIG. 3 is a cross-sectional diagram at the III—III line of FIG. 2.

FIGS. 1 through 3 show a preferred embodiment of the camera battery cover structure according to the present invention. A camera body 10 has a viewfinder eyepiece window 13 attached at the rear surface of the camera body 10. A rear cover 11 is attached at the rear surface of camera body 10 via rear cover hinge 12 so that it can be opened and closed freely.

A battery chamber 20 is positioned so that it forms an opening at a position adjacent to the rear cover hinge 12 at the rear surface of the camera body 10. An open space 21 inside that battery chamber 20 forms a space, in conjunction with the open space 31 inside a battery cover 30, which accommodates a battery 40 (as shown in FIG. 3). An attachment and removal guide 22 extends along the extended line of the hinge shaft of the rear cover hinge 12. A fitting hole 23 is formed near the attachment and removal guide 22. Moreover, a fitting groove 24 is formed in the front side edge of battery chamber 20 in the direction of attachment of battery cover 30, shown by the arrow in FIG. 1.

The battery cover 30 is formed by a surface which corresponds to the rear surface of the camera body 10, a surface that corresponds to the side surface, and a surface that corresponds to the bottom surface (rear edge side of the attachment direction) so that it covers the battery chamber 20 such that the outside surfaces of the approximately box-like rectangular camera body 10 are in smooth conformity after attachment of the battery cover 30. In addition, a guide hole 32 corresponding to the attachment and removal guide 22, a fitting protrusion 33 corresponding to the fitting hole 23, and a fitting protrusion 34 corresponding to the fitting groove 24, are formed on the battery cover 30 on the side edge corresponding to the rear cover hinge 12. Moreover, a first catch protrusion 35, a second catch protrusion 36 having a circular arc surface, and a third catch protrusion 38 protrude at specified intervals from the inner wall surface of the battery cover 30 on the side edge opposite from the rear cover hinge 12 (hereinafter, the outer edge).

Corresponding to the catch protrusions on the battery cover 30, the battery chamber 20 has a first catch protrusion 25 protruding from the outer edge of the battery chamber 20 and having an approximately backwards L-shape. The first catch protrusion 25 forms the first catch section 25a catching the aforementioned first catch protrusion 35 on the battery cover 30 for attachment of the battery cover 30. In addition, the battery chamber 20 has a second catch protrusion 26 functioning as a locking protrusion. The second catch protrusion 26 protrudes further than the first catch protrusion 25 toward the front edge side in the direction of attachment of the battery cover 30 and has a slanted surface such that the second catch protrusion 38 on the battery cover 30, with a circular arc surface, fits onto and goes over the second catch protrusion 26 during attachment of the battery cover 30. A protrusion 27 protrudes from the battery chamber 20 on the outer edge side and, in conjunction with the second catch protrusion 26, forms the catch section 26a for catching the second catch protrusion 36 on the battery cover 30. Also, a third catch protrusion 28 protrudes from the battery chamber 20 on the outer edge side, at a position further toward the front edge side than protrusion 27, and forms a catch section 28a for catching the third catch protrusion 38 on the battery cover 30. The third catch protrusion 28 catches and prevents the slipping out of the aforementioned third catch protrusion 38 on the battery cover 30 during attachment of the battery cover 30. These first, second and third catch protrusions, i.e. 25, 26 and 28 respectively, function as catches which prevent the outer side edge of this battery cover 30 from slipping out of the camera body 10 and from coming off in the attachment direction when the battery cover 30 is attached.

In installing the battery cover 30 so that it is attached to the camera body 10, the battery cover 30 is placed on the battery chamber 20 of the camera body 10 in a condition where an indicator mark 15 on the battery cover 30 is initially aligned with an indicator mark 14 on the rear cover. Next, the battery cover 30 is slid in a direction where another indicator mark 16 on the battery cover 30 is then aligned with the indicator mark 14 on the rear cover 11 (indicator mark 15 is no longer aligned with indicator mark 14 at this point). If this is done, the side edges of the battery cover 30 are guided along the attachment and removal guide 22 of the camera body 10 and the outer edge side wall guide surface so that they move to a point where marks 16 and 14 meet. In addition, the first, second and third catch protrusions on the battery cover 30, i.e., 35, 36 and 38 respectively, are caught by the first, second and third catch protrusions on the battery chamber, i.e., 25, 26, and 28, into catch sections 25a, 26a and 28a, and are locked in a condition where they will not slip out or come off. As described above, the second catch protrusion 36 has a circular arc surface, allowing it to go over the slanted surface of the second catch protrusion 26 and be caught at the second catch section 26a, enabling a locked condition to be obtained. Moreover, the attachment and removal guide 22 fits into the guide hole 32, fitting protrusion 33 fits into the fitting hole 23, and fitting protrusion 34 fits into the fitting groove 24. In this manner, the battery cover 30 is attached onto the camera body 10 in a condition in which it will not fall off.

The reverse operation of the above attachment process may be performed for the removal of the battery cover 30 in which catch protrusions 35, 36 and 38 will come off catch sections 25a, 26a and 28a, enabling simple removal.

The present invention is not limited to the camera battery cover structure of the above embodiment. For example, the attachment and removal guide 22 is not limited to being formed as a unit with the rear cover hinge 12. In another preferred embodiment, the attachment and removal guide 22 may be an extension of the hinge shaft supported within the rear cover hinge 12. Moreover, various modifications may be made to the shapes of the battery chamber 20 and the battery cover 30 to accommodate variously shaped batteries. In addition, the shapes and structures of the respective components other than the battery cover structure in the camera body 10 may, of course, be appropriately changed and modified.

According to the embodiments of the present invention, a camera battery cover structure having an attachment and removal guide 22 located on the extended line of the hinge shaft narrows the gap between the camera's rear cover hinge 12 and the camera battery cover 30. As a result, the width dimensions of the camera body 10 are at a minimum and the camera can be made more compact.

In addition, with the camera battery cover structure according to the preferred embodiments of the present invention described above, the battery cover can be simply removed, independently of the rear cover 11, for easy insertion and removal of a battery 40.

Moreover, by installing the battery cover 30 using the two operations of attaching from the rear surface side of the camera body 10 and then slide-locking in into place, inadvertent dropping of the battery cover 30 during installation can be prevented.

Furthermore, there are no problems such as breakage or damage to the camera's outer appearance as was the case when a common hinge was used for both the rear cover 11 and the battery cover 30. According to preferred embodiments of the present invention, when the battery cover 30 is opened and removed, no damage is caused to the camera's rear cover hinge 12.

It should be understood that the battery cover structure according to the invention is particularly suitable for a camera and that the term camera is not used in a narrow sense but can include different types of camera devices, such as still cameras, video cameras, and the like. Moreover, although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera battery cover structure suitable for a camera with a rear cover hinge, comprising:

a battery cover; and, a guide extended from an end of the rear cover hinge to slidably guide said battery cover during attachment and removal of said battery cover.

2. The camera battery cover structure according to claim 1, wherein said guide is formed as a unit with the rear cover hinge.

3. The camera battery cover structure according to claim 1, wherein said guide is formed from a hinge shaft supported within the rear cover hinge.

4. The camera battery cover structure according to claim 1, wherein said battery cover has an edge adjacent to the rear cover hinge being attached to the camera body by said guide.

5. The camera battery cover structure according to claim 1, further comprising a battery chamber disposed adjacent to the rear cover hinge, and wherein said battery cover covers said battery chamber.

6. The camera battery cover structure according to claim 5, wherein said battery chamber comprises a fitting groove and wherein said battery cover comprises a fitting protrusion fitting into the fitting groove of said battery chamber.

7. The camera battery cover structure according to claim 5, wherein said battery cover comprises catch protrusions and wherein said battery chamber comprises catch sections securing the catch protrusions of said battery cover.

8. A camera battery cover structure suitable for a camera with a rear cover hinge, comprising:

a battery chamber disposed adjacent to the rear cover hinge;

a battery cover to cover said battery chamber; and, a guide extended from an end of the rear cover hinge to slidably guide said battery cover during attachment and removal of said battery cover.

9. The camera battery cover structure according to claim 8, wherein said guide is formed as a unit with the rear cover hinge.

10. The camera battery cover structure according to claim 8, wherein said guide is formed from a hinge shaft supported within the rear cover hinge.

11. The camera battery cover structure according to claim 8 wherein said battery chamber comprises a fitting groove and wherein said battery cover comprises a fitting protrusion fitting into the fitting groove of said battery chamber.

12. The camera battery cover structure according to claim 8, wherein said battery cover comprises catch protrusions and wherein said battery chamber comprises catch sections securing the catch protrusions of said battery cover.

13. A camera battery cover structure suitable for a camera with a rear cover hinge, comprising:

a battery chamber disposed adjacent to the rear cover hinge;

a battery cover to cover said battery chamber; and a guide extended from an end of the rear cover hinge to slidably guide said battery cover during attachment and removal of said battery cover and formed as a unit with the rear cover hinge.

14. The camera battery cover structure according to claim 13, wherein said battery chamber comprises a fitting groove and wherein said battery cover comprises a fitting protrusion fitting into the fitting groove of said battery chamber.

15. The camera battery cover structure according to claim 13, wherein said battery cover comprises catch protrusions and wherein said battery chamber comprises catch sections securing the catch protrusions of said battery cover.

* * * * *